United States Patent [19]
Scheitlin et al.

[11] 3,766,631
[45] Oct. 23, 1973

[54] METHOD OF INTERCONNECTING A TUBE TO A PLATE

[75] Inventors: George E. Scheitlin; Gene Richard Hanson, both of Columbus, Ind.

[73] Assignee: Arvin Industries, Inc., Columbus, Ind.

[22] Filed: May 22, 1972

[21] Appl. No.: 255,695

[52] U.S. Cl. .................. 29/424, 29/423, 29/434, 29/512, 29/523
[51] Int. Cl. .................................. B23p 17/00
[58] Field of Search ............... 29/424, 423, 512, 29/505, 434, 523; 72/352; 113/116 FF, 116 UT

[56] References Cited
UNITED STATES PATENTS

| | | | |
|---|---|---|---|
| 2,195,029 | 3/1940 | Hathorn | 85/40 |
| 2,507,812 | 5/1950 | Phipps | 313/37 |
| 2,535,403 | 12/1950 | Froggatt | 218/19 |
| 2,609,598 | 9/1952 | Mason | 29/512 X |
| 2,932,884 | 4/1960 | Lyon | 29/423 |
| 3,140,540 | 7/1964 | Greenman | 29/523 X |
| 3,183,394 | 5/1965 | Hipszer et al. | 29/523 X |
| 3,345,741 | 10/1967 | Reimann | 29/424 X |
| 3,357,274 | 12/1967 | Dapoz | 29/434 X |

Primary Examiner—Charles W. Lanham
Assistant Examiner—V. A. DiPalma
Attorney—Thomas P. Jenkins et al.

[57] ABSTRACT

A method of forming a slidable interconnection between a tube and an opening in a plate. In accordance with one form of the disclosure said tube is inserted through an opening in said plate and a pair of annular projections are formed on said tube. Prior to forming said projections, a first washer is placed on the tube on one side of said plate and a second washer and a collar formed from an easily destructible material are placed on the tube on the opposite side of the plate with said collar carried against one face of said plate. Said projections are brought into binding engagement with said washers. After said projections are disposed in such binding engagement, the collar is removed to reduce the tightness of the fit between said washers and the plate.

6 Claims, 8 Drawing Figures

METHOD OF INTERCONNECTING A TUBE TO A PLATE

BACKGROUND OF THE INVENTION

In the manufacture of various devices it sometimes is necessary to connect a tube to an opening in a plate by means of a slidable fit so that the tube and plate can expand and contract radially with respect to each other. An example of a connection of this type and character is shown in copending application Ser. No. 204,589, filed Dec. 3, 1971, and entitled "Exhaust Gas Manifold."

In forming such connections, problems are encountered in obtaining the proper tightness of fit between the structures interconnecting the tube to the plate. If they form too tight a connection, there cannot be any relative movement between the tube and plate. Conversely, if they form too loose a connection, leakage will occur at the connection.

It is therefore an object of this invention to provide a simple and inexpensive method of slidably interconnecting a tube to an opening in a plate which will overcome these difficulties.

SUMMARY OF THE INVENTION

In accordance with one form of the invention, a plate having an opening formed therein is placed on a first die and a first rigid washer with the plate opening disposed in alignment with the washer opening. A collar formed from a combustible material is placed on the opposite plate face and second rigid washer is placed on said collar, said collar and second washer having the axes of their openings in alignment with the plate opening axis.

A tube is forced by a second die through the aligned openings into engagement with said first die which deforms said tube to form a first annular projection thereon engaging said first washer. Continued movement of said second die forms a second annular projection on said tube engaging said second washer. Thus, the projections bindingly retain the washers, collar and plate between said projections. After the projections have been formed, the collar is burned away thereby reducing the tightness of fit between said first and second washers and the opposed faces of said plate to permit relative sliding movement between said tube and plate radially with respect to the tube axis.

BRIEF DESCRIPTION OF THE DRAWINGS

The accompanying drawings illustrate the invention. In such drawings.

DETAILED DESCRIPTION OF THE PREFERRED EMBODIMENT

Various methods have been employed for interconnecting a tube to a plate by inserting a tube through a plate opening and forming projections on the tube on opposite sides of the plate to bindingly retain the plate between such projections. Such projections have been formed by deforming the tube itself, mounting rings around the tube, or the like. Our invention may use any of these techniques, but in addition, it requires that a collar formed from an easily destructible material be interposed between the projections. Then, after the interconnection is formed, the collar is removed to remove the binding action of the projections so that the plate and tube are free to radially expand and contract with respect to the tube axis at the plate opening.

Figure 1:
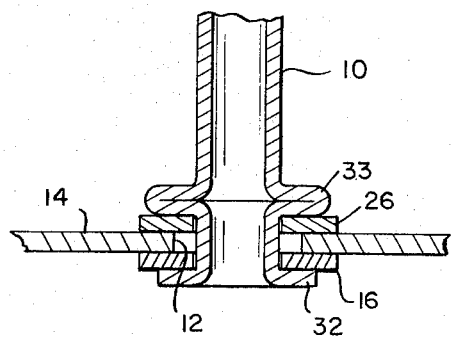
FIG. 1 is a longitudinal section through a tube-plate interconnection made according to the invention.

In the tube-plate interconnection shown in FIG. 1, the tube 10 projects through an opening 12 in plate 14. As shown, the opening 12 has a substantially larger cross-sectional extent than the diameter of said tube. The connection between the tube 10 and plate 14 securely holds them together, but permits relative sliding movement between them. The limits of such sliding movement are defined by the difference in cross-sectional extents between the opening 12 and tube 10

Figure 2:
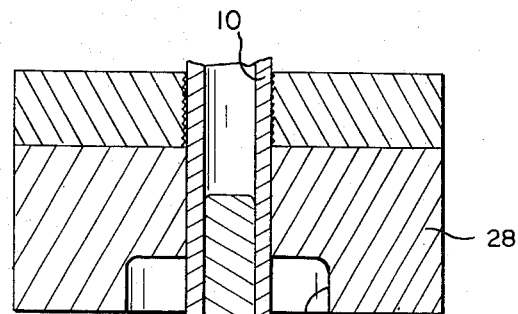
FIGS. 2–4 are longitudinal sections of a die assembly showing the successive sequential steps for carrying out the invention, to form the tube-plate interconnection shown in FIG. 1.
Figure 3:
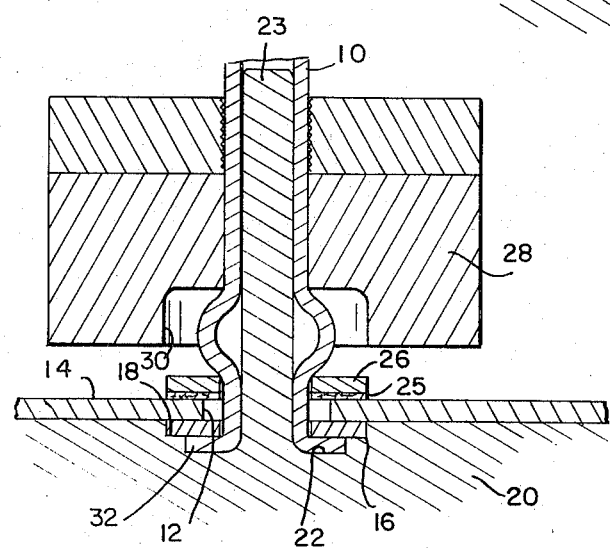
Figure 4:
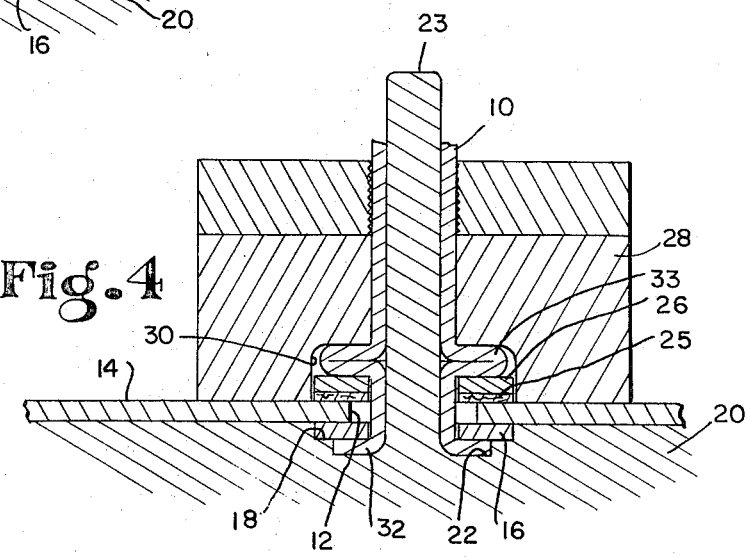

The tube-plate interconnection shown in FIG. 1 is formed by the sequence shown in FIGS. 2–4. As shown, a metal washer 16 is placed on a recessed annular shoulder 18 formed in the upper face of a die 20, and the plate 14 is placed over the upper faces of said die and the washer 16. An annular well 22 extends downwardly from the shoulder 18, and an arbor 23 projects upwardly from the center of said well through the washer 16 and plate opening 12. As shown in FIG. 2, the well diameter is slightly greater than the plate opening 12, but less than the diameter of the shoulder 18.

An annular collar 25 formed from an easily destructible material such as heavy paper, cardboard, or the like is placed over the arbor 23 to rest on the upwardly presented face of the plate 14. A metal washer 26 is then placed over the arbor 23 to rest upon collar 25.

After the collar 25 and washer 26 are in place, the tube 10 is placed on the arbor 23. A split gripping die 28 having an annular recess 30 in its lower face is disposed around the tube 10. As shown in FIG. 2, the die 28 urges the tube inwardly against the arbor and, except for the portion between the dies 20 and 28, supports the tube against outward deformation. The die 28 forces the tube downwardly along the arbor 23 into the well 22 whereupon, with the two dies supporting the tube against elongation and axial movement beyond the confines of the well 22, the lower end of said tube is bent outwardly to form an outwardly projecting, annular projection 32 underlying the washer 16. With the end 32 of the tube engaging the outer edge of the well 22, any further downward movement of the tube by die 28 will cause the unsupported portion of the tube above the washer 26 to be forced outwardly. Thus, as shown in FIG. 3, after the end of the tube has been bent outwardly in the well 22, the die 28 continues to move the tube downwardly toward plate 14 and the portion of the tube above the washer 26, which is not supported against outward deformation, bends outwardly into the recess 30 and over washer 26 to form an annular folded projection 33 extending over the upper face of said washer. The downward movement of die 28 forces the projection 33 against the washer 26 to thus bindingly retain the stacked washer 16, plate 14, collar 25, and washer 26 between the projections 32 and 33. After the projection 33 has been formed and pressed against the washer 26, the die 28 is removed, and the tube with the plate rigidly connected thereto is withdrawn off of the arbor 23.

After the assembly shown in FIG. 4 has been removed from the dies and arbor, the collar 25 is removed from the assembly. The method of removing the collar will, of course, depend upon the type of material from which said collar is made. Most conveniently, the collar can be made from a combustible material so that it can be simply burned away. With the collar removed the depth of the remaining components stacked between the tube projections 32 and 33 is reduced. This reduces the binding action of the projections 32 and 33 so that the tube 10 and plate opening 12 can expand and contract with respect to each other. During such expansion and contraction movements, the washers 16 and 26 will slide against the adjacent faces of the plate 14. The inner diameters of the washers are substantially smaller than the cross-sectional extent of opening 12 and their outer diameters are substantially greater than the cross-sectional extent of said opening 12 so that said washers will not interfere with the relative movement between the tube and plate and will cooperate with the projections 32 and 33 to prevent leakage at the tube-plate interconnection.

While the sequence illustrated in FIGS. 2–4 shows the washer 16 and plate 14 placed on the die 20 prior to the formation of the projection 32, said plate and washer can, of course, be placed on said die after the formation of said projection. This sequence would require, however, removing the die 28 from the tube 10 to permit said tube to be inserted through the washer 32 and plate opening 12 after the projection 32 was formed.

Figure 5:
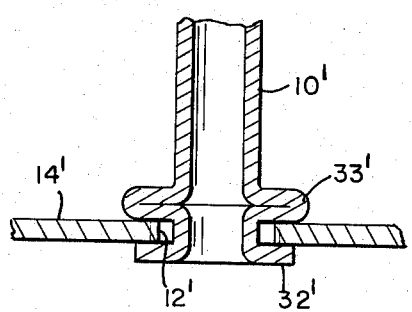
FIG. 5 is a longitudinal section similar to FIG. 1, but showing a modified embodiment of a tube-plate interconnection made according to the invention.

In the embodiment shown in FIG. 5, the washers 16 and 26 are eliminated, so that during relative movement of the tube 10ʹ and plate 14ʹ said plate slides directly against the tube projections 32ʹ and 33ʹ.

Figure 6:
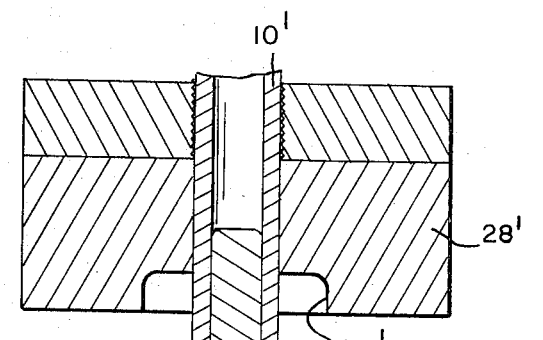
FIGS. 6–8 are longitudinal sections of a die assembly showing the successive sequential steps for carrying out the invention to form the tube-plate interconnection shown in FIG. 5.
Figure 7:
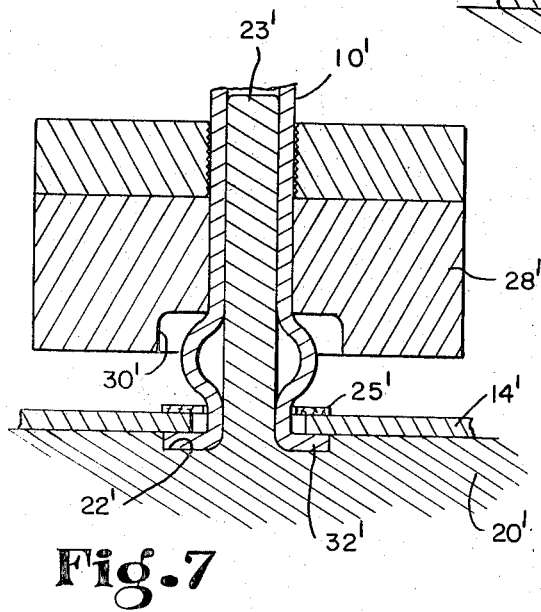
Figure 8:
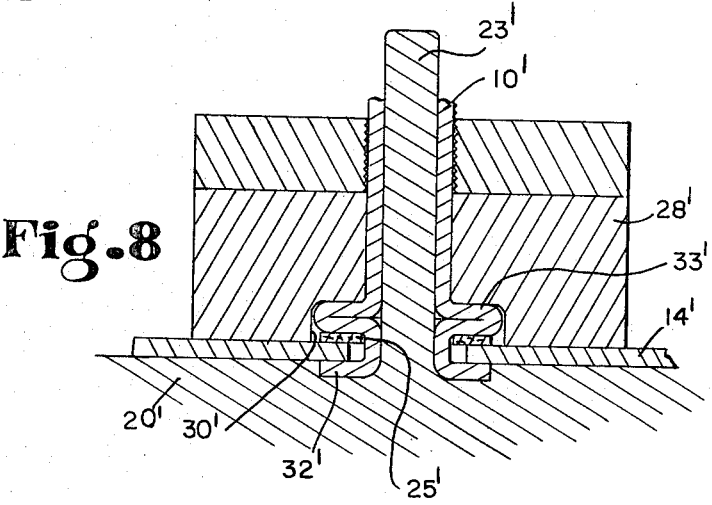

The sequence for forming the tube-plate interconnection shown in FIG. 5 is illustrated in FIGS. 6–8. As shown, the plate 14ʹ is placed on the upper face of die 20ʹ. The die 20ʹ has an annular well 22ʹ formed in its upper face, and an arbor 23ʹ projects upwardly from the center of said well through the plate opening 12ʹ, which opening is substantially larger than the diameter of the tube 10ʹ. An annular collar 25ʹ formed from an easily destructible material is placed over the arbor 23ʹ and rests on the upper face of the plate 14ʹ.

After the collar 25ʹ is in place, the tube 10ʹ is placed on the arbor 23ʹ with its upper end carried in a split gripping die 28ʹ having an annular recess 30ʹ in its lower face. As shown in FIG. 7, the die 28ʹ forces the tube 10ʹ downwardly along the arbor 23ʹ into the well 22ʹ to bend the lower end of said tube outwardly to form the outwardly projecting annular projection 32ʹ underlying the plate 14ʹ around the opening 12ʹ. After the end of the tube has been bent outwardly in the well 22ʹ, the continued downward movement of the die 28ʹ causes the portion of the tube above the collar 25ʹ, which is not supported against outward deformation, to bend outwardly into the recess 30ʹ and over the collar 25ʹ to form the annular folded projection 33ʹ extending over the collar 25ʹ. The projection 33ʹ is forced against the collar 25ʹ to bindingly retain said collar and the plate between the projections 32ʹ and 33ʹ.

After the assembly shown in FIG. 8 has been removed from the dies and arbor, the collar 25ʹ is removed from the assembly in the manner described in connection with collar 25. With the collar 25ʹ removed the binding action of the projections 32ʹ and 33ʹ is reduced so that the tube 10ʹ and plate opening 12ʹ can expand and contract with respect to each other with the plate sliding against the adjacent faces of the projections. The projections 32ʹ and 33ʹ have diameters substantially greater than the cross-sectional extent of the opening 12ʹ so that said projections will extend over the edges of said opening irrespective of the plate and tube movements.

While each of the embodiments has been described as having its projections 32, 32ʹ, 33, and 33ʹ formed as integral folds or deformations on the tube, it is to be understood, of course, that such projections can be in the form of metal collars or rings welded or otherwise rigidly connected to the outer tube face at axially spaced positions to bindingly engage the components sandwiched therebetween prior to removal of the destructible collar. As will also be apparent, the plate to which the tube is connected need not be planar, but if desired, may have an arcuate configuration at or adjacent the tube connection.

I claim:

1. A method of interconnecting a tube to a plate, comprising the steps of supporting a first washer against one face of a plate, placing an annular collar formed of an easily destructible material against the opposite face of said plate, placing a second washer on said collar, said collar, washers and plate having openings whose axes are disposed in alignment with each other and whose cross-sections are substantially larger than the diameter of said tube, inserting said tube through said opening, forming a first annular projection on said tube in engagement with said first washer, forming a second annular projection on said tube in engagement with said second washer, forcing said projections into binding engagement with said washers, and removing said collar to permit said tube and plate to move with respect to each other at said plate opening radially with respect to the tube axis.

2. A method of interconnecting a tube to a plate, comprising the steps of inserting a tube through aligned openings in a stack consisting successively of a first washer, an annular collar, a plate, and a second washer, said collar being formed of an easily destructible material, forming a first annular projection in a first position around said tube in engagement with said first washer, forming a second annular projection in a second position around said tube in engagement with said second washer, said first and second positions being axially disposed along said tube to cause said projections to bindingly engage said washers, and removing said collar to permit said tube and plate to move with respect to each other at said plate opening radially with respect to the tube axis.

3. The method of interconnecting a tube to a plate as set forth in claim 2 in which said steps of forming annular projections on said tube comprise deforming said tube to form integral projections thereon extending radially outwardly therefrom.

4. The method of interconnecting a tube to a plate as set forth in claim 2 in which said steps of forming annular projections on said tube comprise fixedly mounting a pair of rings on said tube.

5. The method of interconnecting a tube to a plate as set forth in claim 2 in which said collar is combustible and said step of removing said collar comprises burning said collar off of said tube.

6. A method of interconnecting a tube to a plate, comprising the steps of inserting a tube through aligned openings in a plate and an annular collar, said plate opening being substantially larger than the diameter of said tube and said collar being formed from an easily destructible material, forming a first annular projection in a first postion around said tube in engagement with said collar, forming a second annular projection in a second position around said tube in engagement with said plate, said first and second positions being axially disposed along said tube to cause said projections to bindingly engage said collar and plate, and removing said collar to permit said tube and plate to move with respect to each other at said plate opening radially with respect to the tube axis.

* * * * *